INVENTOR.
RALPH M. HEINTZ
BY
Lippincott & Smith
ATTORNEYS

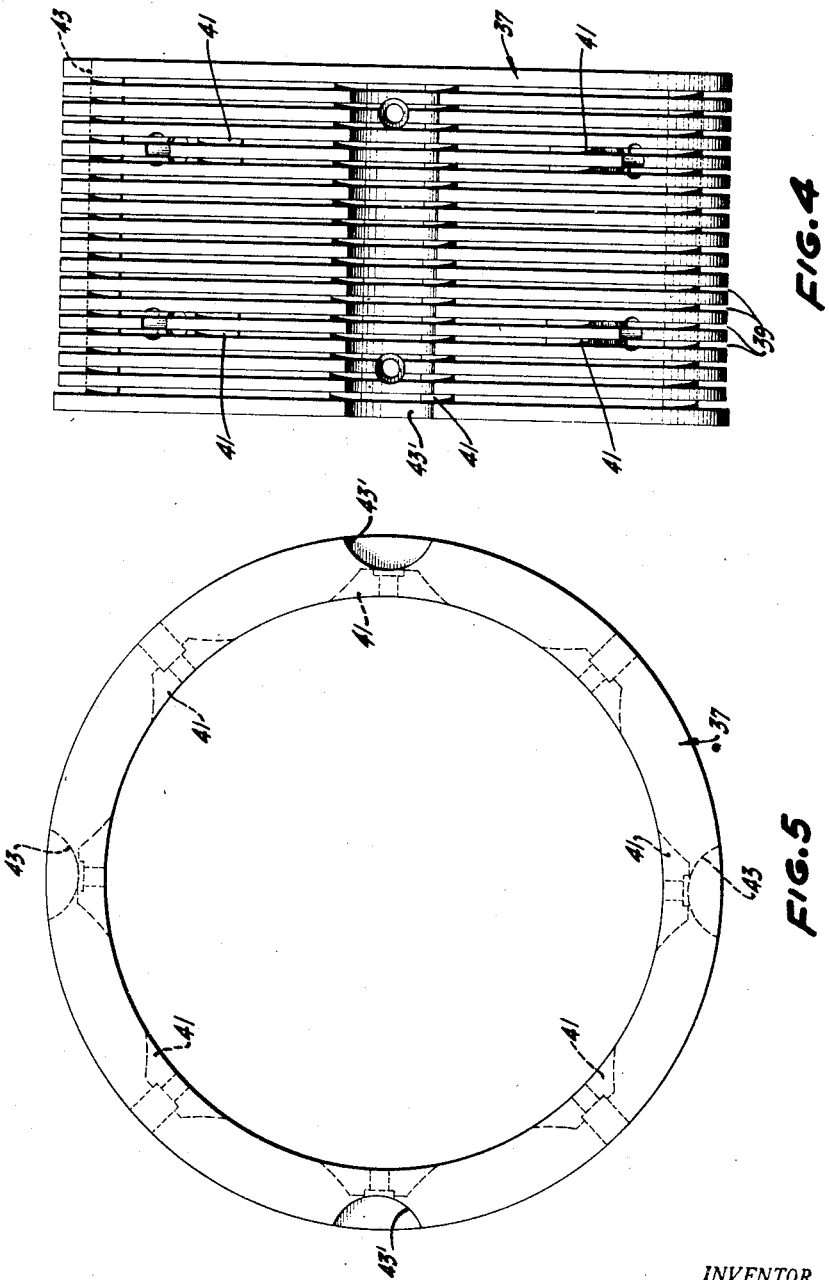

United States Patent Office 2,706,260
Patented Apr. 12, 1955

2,706,260

LIQUID COOLED DYNAMO-ELECTRIC MACHINE

Ralph M. Heintz, Los Gatos, Calif., assignor to Jack & Heintz, Inc., Cleveland, Ohio, a corporation of Delaware Application April 20, 1953, Serial No. 349,634

7 Claims. (Cl. 310—54)

This application relates to liquid-cooled dynamo-electric machinery, and while of general applicability, the invention is particularly applicable to such devices designed for use in aircraft, where small size and minimum weight are specially important. This application is one of a group covering various features of such generators and relates particularly to the circulatory system through which the liquid coolant is propelled.

Among the objects of this invention are to provide liquid-cooled dynamo-electric machines having a circulatory system wherein the path of the coolant is such as to provide maximum transfer of heat to it from both the magnetic and electrical circuits; to provide a machine of the class described wherein the pumping means for circulating the coolant is entirely self contained within the machine itself; to provide a machine wherein the coolant path may be substantially hermetically sealed, so that leakage of the coolant is negligible; to provide a machine which presents no difficult problems of manufacture or assembly; and to provide such a machine having minimum added weight as a result of being liquid-cooled.

In a liquid-cooled motor or generator a number of problems exist which are not present where air or gas cooling is used, even though the latter type of cooling may be employed in a completely sealed device. With gas cooling the coolant may be introduced at one end of the frame and removed from the other, circulating around the core and windings and passing through the gap between the magnetic structures of rotor and stator. In a liquid-cooled device the additional skin friction introduced by the presence of the coolant in the gap and around the coils would be so great as to make this procedure prohibitive. In order to conserve power the space between rotor and stator must be air or gas filled, and therefore separate circulatory paths must be provided in both stator and rotor if the cooling is to be applied to the latter.

Sometimes this problem is avoided by applying the liquid cooling to the stator only, constructing the rotor so that it will withstand higher temperatures; e. g., in alternating curent machines, using a rotor of the squirrel-cage type, without external connections. This is not feasible in direct current machinery.

In accordance with the present invention the problem is solved through the combination of a number of features, which lead to the formation of a passage for the coolant through the machine in one continuous stream, impelled by a pump constructed within, and essentially as a part of the rotor. In this arrangement operative parts of the machine are enclosed within a liquid tight housing comprising inner and outer concentric shells defining an annular space which is closed at both ends. A stator structure is disposed in the central portion of the annular space and comprises a plurality of salient poles magnetically connected by an annular yoke structure which is slotted in such manner as to form passages for the coolant in a generally axial direction thereof. The yoke, pole pieces and coils together substantially fill the entire space between the shells except for these slots and the interspaces between the windings, which are of small dimensions so that the circulation divides between the interspaces and the slots in the core structure itself. Coolant is discharged from the anular space at one end of the stator structure. The space at the other end connects through a duct to a passage through which the coolant flows in a generally radial direction into the stator from the rotor structure. This passage is formed between an end-bell mounted on the housing, and a bearing support and bearing mounted inboard of the end-bell. The inner race of the bearing carries one end of a hollow shaft of relatively large diameter opening into the radial passage. Preferably this shaft is formed of metal of relatively high thermal conductivity, such as aluminum or aluminum alloy. Annular rotor core punchings, forming the magnetic circuit of the rotor, are force-fitted over the shaft, the large diameter of the latter, cooperating with the force-fit, giving an excellent thermal bond between the punchings and the shaft. Furthermore, since, as will be shown, the temperature gradient is inward from the core to the shaft, although the core punchings will expand and operate at running temperatures higher than the shaft, the higher thermal coefficient of expansion of the shaft material serves to maintain this bond.

Within the hollow shaft pump vanes are formed. For ease of manufacture these are preferably in the form of a plurality of radially extending fins projecting inwardly from the wall of the hollow shaft. The end of the shaft, opposite that which opens into the radial passage already described, is completely closed. A tubular fixed shaft extends inwardly from the end-bell through the open end of the hollow rotor shaft and opens into the closed end of the latter. The fixed shaft carries pump impeller vanes adapted to coact with the vanes which are secured to the hollow shaft to form a pump, circulating the coolant within the device. Preferably this pump is of multiple stages and the impeller vanes are of helicoidal form. The two sets of vanes therefore form a turbine type pump which differs from conventional type pumps of this character largely in the fact that the helicoid vanes are stationary and the "straightening" vanes rotate. The fixed shaft connects, through a fitting formed in the end-bell, to the external circulatory system, which will usually include a radiator or other form of heat exchanger forming a closed system connected from the discharge. The direction of the circulation of coolant will, of course, depend upon the direction of rotation of the rotor with respect to the pitch of the helicoidal pump vanes and can be in either direction. Preferably, however, the path of the coolant is in through the tubular fixed shaft and out of the open end thereof into the closed end of the hollow shaft, thence back through the pump vanes, passing through the portion of the hollow shaft which is in close thermal contact with the electrical structure of the rotor into the passage behind the end-bell, thence through the duct between this passage and the annular space between the inner and outer shells of the housing, through the electromagnetic stator structure and thence out through the discharge, since this gives somewhat better heat-exchange characteristics than flow in the opposite direction.

All of the above will be more readily understood by reference to the following description of the invention as applied to a direct current generator, taken in connection with the accompanying drawings wherein:

Fig. 4 is a plan view of the stator yoke; and

Fig. 5 is an end elevation of the stator yoke.

Figure 1:
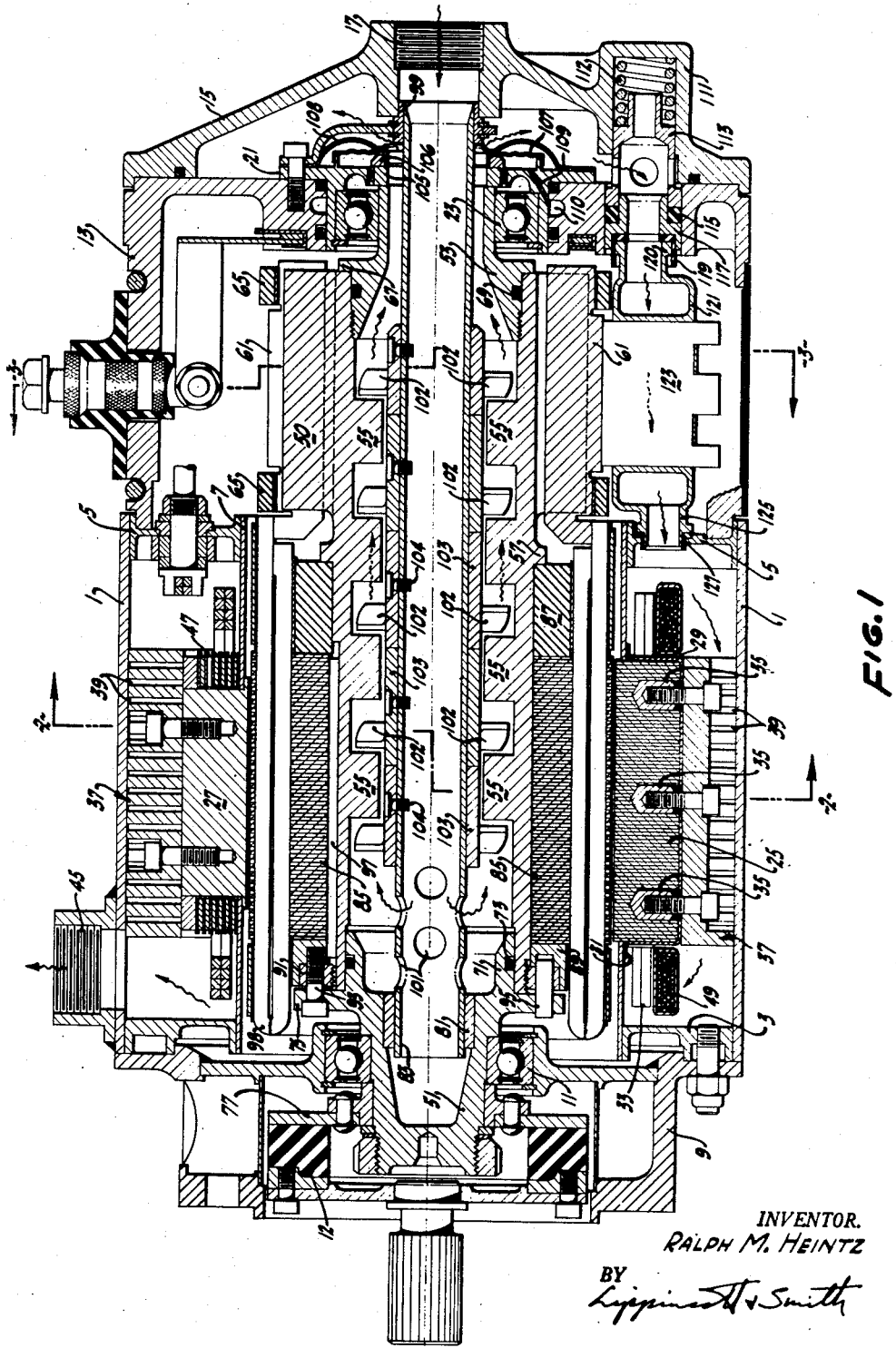
Fig. 1 is a composite longitudinal section of a D. C. generator embodying preferred form of the invention.
Figure 2:
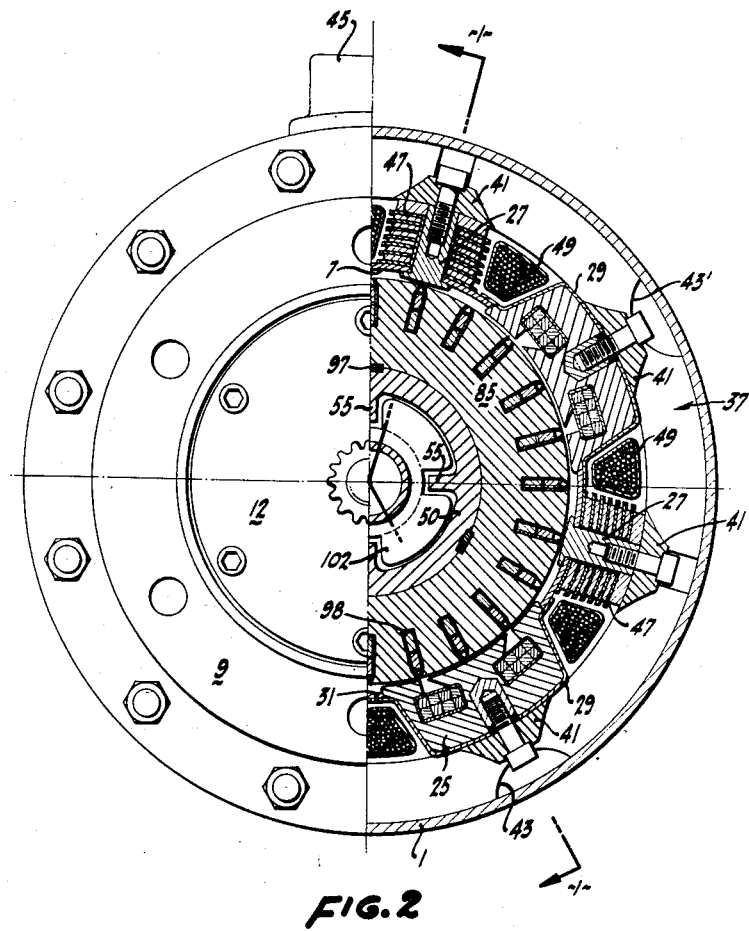
Fig. 2 is an end view, partly in elevation and partly in section on a plane indicated at 2—2 of Fig. 1, the planes of section of Fig. 1 being indicated by the lines 1—1 of Fig. 2.
Figure 3:
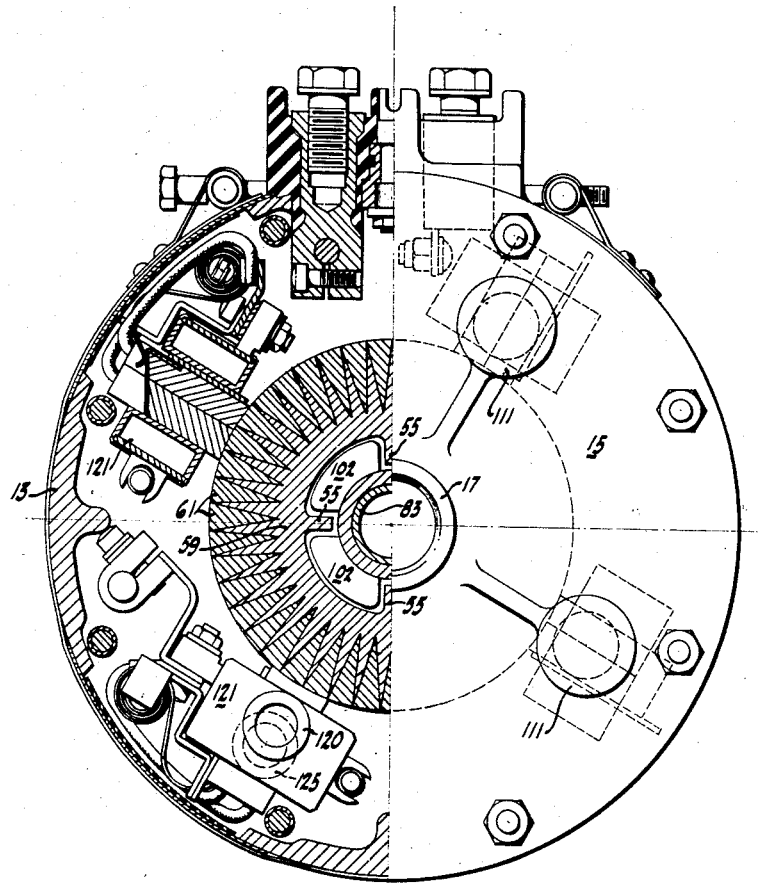
Fig. 3 is a similar view, one half in end elevation and one half in section, of the commutator end of the generator, the plane of the latter portion being indicated by the lines 3—3 of Fig. 1.

The general structure of the generator illustrated in the drawings can best be seen in Fig. 1, occasional reference being made to Figs. 2 and 3. The overall housing comprises a tubular outer shell 1, within which is mounted, by means of annular closures or spacers 3 and 5, an inner shell 7. The outer shell 1 has sufficient thickness and rigidity to act as a supporting member for the whole structure. It is preferably of steel tubing. The inner shell 7, which supports the field structure, is preferably made of stainless steel tubing and is substantially non-magnetic.

An end-bell 9, secured to the annular spacer 3, carries a relatively large diameter rotor bearing 11 and also encloses a flexible coupling drive 12 for the armature or rotor, later to be described. At the opposite or commutator end of the device a spacer cage 13 is interposed between the annular spacer 5 and an end-bell proper 15. The latter is without exterior openings except for a central fluid-inlet coupling 17. The end-bell 15 is preferably of aluminum alloy. Within it and spaced from its inner surface, the spacer cage 13 carries a steel bushing 21 supporting a second armature bearing 23. This completes the overall housing.

As can be seen most clearly in Fig. 2, the machine illustrated is of the salient pole type, having four main poles 25 alternating with commutating interpoles, generally indicated by the reference characters 27. The structure of the main poles is particularly described and claimed in application Serial No. 349,633 filed concurrently with this application. It should be sufficient for the present explanation to state that each of these main poles comprises a stack of laminations of the form shown in Fig. 2 within a retaining cup 29, the open end of the cup facing inward toward the rotor structure. A flange 31 around the open edge of the cup conforms to the contour of the inner shell 7 and is brazed thereto. The shell is apertured to permit the laminations comprising the pole piece to extend therethrough toward the rotor. The compensating winding 33, for the conventional purpose of neutralizing armature reaction at least in part, is threaded through apertures in the pole piece punchings which are provided for the purpose. After the assembly of the pole piece laminations within the cup 29, holes are drilled for internally threaded thimbles 35, by means of which the pole pieces are bolted to an annular yoke 37.

Interpoles 27 are of solid construction; essentially each comprises a substantially rectangular slug, flanged at its inner end to bear against the inner side of the shell 7, the latter being apertured to permit the pole to project through it as in the case of the main pole.

Both main poles and interpoles are secured to a common yoke structure by bolts as shown. The yoke is best illustrated in Figs. 4 and 5. It comprises an annulus of high permeability soft iron or steel, such, for example, as the material marketed under the trade name of "Armco Ingot Iron." The outer diameter of the annulus is such as to fit tightly within the outer shell 1; its inner diameter is such as to conform to the curvature of the cup 29 and hold the pole pieces in position to give proper clearance between them and the rotor. The axial length of the annulus is equal to that of the pole pieces. Formed in it, between each pair of poles, both main poles and interpoles, there are formed a plurality of equally spaced slots 39 in parallel planes perpendicular to the axis of the machine. These slots are such as may be formed by circular milling cutters. They penetrate entirely through the core midway between the poles, leaving rings which are held together by bridges such as are indicated in cross section at 41 in Fig. 2 and in dotted outline in Fig. 5. The points on the bridges 41 which are left by the cutters are removed to give the bridges the form shown, and they are drilled and countersunk for the stud bolts which hold the pole pieces in place.

All of these peripheral slots are joined by grooves 43, 43', running parallel to the axis and longitudinally of the machine above one of the sets of pole pieces, in this case the main poles. One half of the grooves open into the annular space at the left of the machine (as shown in Fig. 1) while the other half of the grooves open into the annular space at the right of the machine, the grooves being closed at the ends opposite those mentioned by remaining flanges in the portion of the core left beyond the last slot at one or the other end. Thus coolant entering the annular space at the right of the pole structure flows through grooves 43, but is prevented from passing directly into the annular space at the left by the remaining flange. It therefore must flow peripherally through slots 39 to reach grooves 43', from which it can escape into the annular space at the left of Fig. 1 and out through a fluid connection 45 provided for the purpose.

In assembling the stator, the cores are mounted to the inner shell 7, windings 47 are disposed on the interpoles and main windings 49 on the main poles, the yoke is then slipped over the whole structure and bolted in place, thus completing the magnetic structure of the stator or field. It will be seen that when coolant is introduced into the annular space at the right of the core under pressure some will pass through the interspaces between the main windings, the main poles, and the interpole windings, although due to the somewhat tortuous path that this coolant must follow the amount so flowing would not be quite as great as the spacing shown in the figures might suggest. The remainder of the coolant follows the path mentioned through the yoke structure, coming in close contact with both the yoke and the pole-piece cups. There results an excellent heat transfer between the field or stator structure and the coolant.

Turning now to the rotor structure which is carried by the bearings 11 and 23, it is, as has been stated, mounted on a hollow shaft. In the preferred construction illustrated in the figures, the shaft comprises three major elements, i. e., a shaft body 50, a closed bearing end 51 and an open bearing end 53. The body portion 50 is considerably larger in outside diameter than would be the case in a machine of the usual type—in the present case two to three times as great. It is hollow, is formed of metal of relatively high heat conductivity such as an aluminum alloy, with walls sufficiently thick to give it the necessary rigidity for its purpose, but in view of its tubular construction and large diameter it is, in spite of this fact, relatively light. The relative thickness required is not great, the proportions being substantially as shown in the figure. Projecting inwardly from its inner surface are a plurality of sets of pump vanes 55, which, for the sake of ease in machining, are alined in rows parallel to the axis of the machine and for purely functional reasons are also alined in circumferential rows. In this case there are sixteen vanes altogether, with four vanes in each longitudinal and circumferential row. The outer surface of the shaft body is formed with a shoulder 57 for retaining the magnetic structure of the armature. Preferably, also, the body or support 59 for the commutator bars is formed integrally with the shaft, in accordance with the construction described and claimed in Patent No. 2,606,221 issued August 5, 1952, to the applicant herein. As is disclosed in the patent mentioned the commutator bars themselves are wedge-shaped members 41, insulated from the support by mica sheets and retained in position by shrink rings 65.

The open bearing end 53 is preferably made of hardened steel or "Nitrolloy." Internally it is tapered from the full diameter of the shaft body down to approximately half that diameter. Externally it carries a flange 67, abutting the commutator end of the shaft body and the bearing end is screwed tightly into the body portion. An O ring 69 forms a seal preventing leakage of the coolant past the joints between the two portions of the shaft. The outboard end of the bearing end is force-fitted into the inner race of the bearing 23.

The closed bearing end 51 is also formed of hardened steel or "Nitrolloy." Its inboard end 71 fits tightly within the shaft body 50 and is also provided with an O ring seal 73. A flange 75 bears against the end of the shaft body 50 and is apertured for bolts and dowels by which the part 51 is secured to the shaft. Outboard of the flange 75 part 51 is reduced in diameter and is force-fitted within the bearing 11. Outboard of this again is attachment 77 for the flexible coupling 12 through which the generator is driven, but as this does not concern the invention herein claimed it is not described in detail. The interior of the bearing end is hollow and carries a bearing bushing 81 for a fixed-shaft 83 which will be described below.

The magnetic circuit of the armature comprises a stack 85 of laminations which are, except for their large internal diameter, of conventional form. The stack is held in compression between an aluminum retaining ring 87 and a steel ring 89.

The outer end of the steel ring is counterbored to receive a clamp ring 91, which is threaded over the end of the shaft body 50 and is screwed down to tighten the whole assembly. Cap-screws 93 and dowels 95 pass through the flange 75 in the closed bearing end of the shaft, the clamp ring 91 and the steel retaining ring 89 hold the whole armature assembly solidly together. Rotation of the magnetic structure on the shaft is prevented by a key 97. The armature windings 98 are entirely conventional and need not be described in detail.

The tubular fixed-shaft 83 projects inwardly through the center of the hollow shaft, being secured to the inlet fitting 17 of the end-bell 15 within a bracket collar 99. The opposite end of the fixed shaft is journaled in the bearing 81 carried by the closed bearing-end of the hollow shaft. Adjacent this bearing the fixed shaft is provided with apertures 101, opening from the fixed shaft into the main hollow shaft to provide for the passage of the coolant into the latter.

Mounted on the fixed shaft are helicoidal vanes 102, which are mounted on a sleeve 103 fitting over the stub shaft and secured thereto by counter-sunk screws 104. The helicoidal blades operate between the circumferential rows of blades 55, with an additional row of helicoidal blades at either end of the circumferential rows of radial blades. It will be clearly seen that the helicoidal and radial blades coact to form a multi-stage, turbine-type pump which, with the direction of rotation for which this particular machine is designed, draws the coolant in through the connection 17 and the apertures 101 and forces it out through the open bearing of the shaft, around the fixed shaft and into the radial passage between the end-bell 15, the spacer cage 13, and bearing 23. Leakage of the coolant from the passage way thus formed is prevented by a bearing seal 105 of molded material which bears against the open bearing end and is held within a metal retaining ring 106 which is counterbored to receive it. The retaining ring 106 is secured to the bearing support 21 by an annular corrugated spring diaphragm 107, brazed, or otherwise hermetically sealed to both parts. A plurality of spring fingers 108, projecting inwardly from a ring clamped to the ring 21, hold the molded seal ring 105 tightly against the end of the hollow shaft. O-ring seals are provided at all of the nonrotating contact surfaces, in accordance with usual practice, to prevent leakage of the coolant from its designed channel into the interspace between rotor and stator, and it will be seen that the only joint not thus sealed is that between the end of the part 53 and the molded ring 105. The experiment has shown that such leakage, between a ground and polished surface such as is provided at the end of the part 53 and a molded material such as Teflon is practically negligible. Such coolant as does escape through this moving contact into the bearing or into the space behind the diaphragm 107 is drained off through a drain hole 109 into a peripheral channel 110, and the latter is provided with a duct (not shown) which carries such drainage externally of the machine.

Circulation of coolant from the passage formed between the end-bell and the bearing support into the stator structure is provided by a plurality of ducts which, in the present instance, form the brush holders. The machine described being of the four pole type, four brush holders and ducts are provided. The details of these brush holders are covered by a concurrently filed application of the same inventor, Serial No. 349,631, and therefore, for the present purpose, only a brief description need be given. Hollow bosses 111 project from the end-bell 15 parallel to the axis of the device. Within each of these bosses is a stiff spring 112 which bears against a hollow plunger 113 extending within the boss. The end of this plunger, projecting beyond the bore of the boss, is apertured to permit coolant to flow into it. Beyond the aperture the end of the plunger slides into a bore in spacer cage 13, compressing a neoprene ring 115 against a flange on a collar 117. One end of the collar fits slidingly inside the seal ring and the plunger 113. The collar flange is counterbored to receive an insulating ring 119, within which is fitted a projecting flange 120 on a tubular connection with a hollow brush holder 121. The latter is formed with a channel encircling the brushes 123, which communicates with a flanged exit fitting 125. This passes through a corresponding orifice in the annular closure 5 through an insulating gasket 127. The spring 112 exerts pressure on the entire brush holder structure, compressing the seal ring 115 and the gasket 127 to keep the fluid passage tight against leakage.

It will be seen that there is thus formed within the structure a circulatory system which is complete except for an external radiator or heat exchanger. Relatively low temperature coolant flows in through the connection 17 and the fixed shaft, and thence outwardly through the apertures 101 and back through the pump comprising the vanes 55 and 102. During its passage through the latter it is turbulent and in contact with the large surface offered by the hollow shaft and the inwardly projecting fins and therefore in a condition to absorb rapidly the heat flowing inward from the iron and coils of the armature. From the pump it passes out through the open end of the shaft into the radial passage between the end-bell and the spacer cage into the ducts formed by the brush holder structure, absorbing, on the way, heat generated in the brushes and the commutator contacts before it enters the annular space in the stator structure. It thence flows past the stator coils and through the grooves and slots in the yoke structure into the space at the opposite end of the stator, escaping through the connection 45 to return to the heat exchanger. Throughout its flow it is in intimate thermal connection with the portions of the apparatus wherein heat is generated during the operation. In the stator this contact is direct. In the rotor it is with the shaft having a large area in contact with the elements wherein heat is generated, to provide a low thermal gradient. The arrangement thus offers a compact self contained system which increases the size of the generator only slightly but increases its load carrying capacity very materially, owing to the effective removal of heat therefrom.

One advantage of the structure that may not be self-evident but is of considerable practical importance is that the commutator and brushes are located in a space which is almost completely surrounded by the cooling liquid. The latter not only flows inside the commutator, but where it passes radially from the rotor to the stator it absorbs heat from one end of the commutator chamber, and the annular closure at the other end also absorbs heat. The commutator therefore operates in an "air conditioned" space, the cooled air acting as a secondary coolant for those portions of the machine where liquid cooling is not feasible. For operation at high altitude pressurizing can readily be accomplished, thus making the equipment effectively "environment free."

It will be recognized that while the cooling system of this invention has been described in connection with a particular direct current machine it is not limited to equipment of this class. It is for this reason that various portions of the equipment which are important to its actual functioning but are not directly related to the invention at hand have not been described in detail. Certain of these features, including some which are covered by concurrently filed applications, have been briefly touched upon, but only to the extent necessary to indicate their function in this particular structure, since they could also be employed in conventional air or gas cooled machines as well as those employing other types of liquid cooling. The detailed description given of the generator chosen for illustrative purposes is therefore not intended to be limiting, all intended limitations upon the scope of the invention being expressed in the following claims.

I claim:

1. A dynamo-electric machine comprising a housing including inner and outer substantially concentric shells defining an annular space, annular closure members for the ends of said space, a field magnet structure mounted in the central portion of said space including a yoke member having slots therein forming passages for coolant therethrough, an end-bell for said housing, a bearing support within and spaced from said end-bell and a rotor bearing carried by said support, said support and bearing defining with said end-bell a chamber for radial flow of coolant, a duct connecting said chamber and said annular space, a hollow rotor shaft journaled on said bearing, pump blades projecting inwardly within said hollow shaft, said hollow shaft opening into said chamber at one end and being closed at the opposite end thereof, a tubular fixed shaft opening into the closed end of said hollow shaft and supported concentrically therewith from said end-bell, pump vanes mounted on said fixed shaft and positioned to coact with the aforementioned pump blades and external coolant connections into said annular space and said fixed shaft providing a continuous passage for circulation of coolant through said machine.

2. A dynamo-electric machine comprising a housing including an outer shell and end brackets secured thereto, a tubular inner shell mounted concentrically within said housing and means for supporting said inner shell forming a fluid-tight annular space between said shells, a field magnet structure within said space and supported by said shells comprising a plurality of pole structures and a yoke connecting said pole structures, said yoke having a multiplicity of slots therein to permit the passage of coolant therethrough generally longitudinally of said space and said stator structure otherwise blocking the passage of coolant into one end of said space, rotor bearings supported by each of said end brackets, an end-bell covering the armature bearing at the end of said housing opposite said coolant connection to form a passage between said bearing and said end-bell, a duct connecting said annular space and said last mentioned passage, a hollow rotor shaft extending axially of said inner shell and journaled on said bearings, pump blades extending inwardly into said shaft, a tubular fixed shaft fixedly secured to said end-bell and extending axially through said hollow shaft and having openings into the interior thereof at the end opposite said end-bell, pump vanes adapted to coact with said first mentioned blades extending outwardly from said tubular shaft, and a connection for coolant into said tubular shaft.

3. A dynamo-electric machine comprising a housing including inner and outer substantially concentric shells defining an annular space, annular closure members for the ends of said space, a field magnet structure mounted in the central portion of said space including a plurality of salient poles and a yoke members supporting said poles, said yoke member comprising an annular cylinder from which said poles project inwardly, said cylinder having a plurality of slots formed therein substantially perpendicular to the axis thereof between each pair of poles and longitudinal grooves connecting said slots, alternate grooves opening respectively into opposite ends of said annular space to form with said slots a generally longitudinal passage for coolant through said stator structure, an end-bell for said housing, a bearing support within and spaced from said end-bell and a rotor bearing carried by said support, said support and bearing defining with said end-bell a chamber for radial flow of coolant, a duct connecting said chamber and said annular space, a hollow rotor shaft journaled on said bearing, pump blades projecting inwardly within said hollow shaft, said hollow shaft opening into said chamber at one end and being closed at the opposite end thereof, a tubular stub-shaft and positioned to coact with the aforementioned pump vanes and external coolant connections into said annular space and said stub-shaft providing a continuous passage for circulation of coolant through said machine.

4. A stator construction for liquid-coolant dynamo-electric machines comprising inner and outer concentric shells defining an annular space therebetween, and a magnetic structure disposed between the ends of said space and comprising a plurality of salient poles and a yoke member supporting said poles, said yoke member comprising an annular cylinder from which said poles project inwardly, said cylinder having a plurality of slots formed therein substantially perpendicular to the axis thereof between each pair of poles and longitudinal grooves connecting said slots, alternate grooves opening respectively into opposite ends of said annular space to form with said slots a generally longitudinal passage for coolant through said magnetic structure.

5. In a liquid-cooled dynamo-electric machine; a supporting frame, a hollow rotor shaft journaled within said frame, a plurality of pump blades projecting inwardly within said hollow shaft, and a closure at one end of said shaft, a tubular fixed shaft fixed to said frame extending axially through said hollow shaft and opening into the closed end thereof, and pump vanes projecting outwardly from said stub-shaft and adapted to coact with said hollow shaft pump blades to circulate a coolant.

6. The invention as defined in claim 5 wherein the inwardly projecting pump blades within said hollow shaft comprise a plurality of axially and circumferentially alined spaced radial fins, and the pump vanes on said fixed shaft comprise helicoidal vanes each subtending an angle about the axis of said shafts substantially equal to the angular separation of said fins and positioned to rotate between the circumferential rows thereof.

7. A dynamo electric machine comprising substantially concentric shells defining an annular space, and closures at each end thereof, a field magnet structure mounted in the central portion of said space including a yoke member having slots therein forming a passage for coolant therethrough, an end-bell for said housing, a bearing support within and spaced from said end-bell, a rotor bearing carried by said support, said support and bearing defining with said end-bell a chamber for radial flow of coolant, a hollow rotor shaft journaled in said bearing, a commutator on the end of said rotor shaft adjacent to said bearing support, and between said bearing support and said annular space, rotor structure carried by said hollow shaft within said stator structure, ducting means connecting said chamber and said annular space, pumping means within said hollow shaft, for circulating a coolant liquid, and connections for such coolant to the interior of said hollow shaft and the end of said annular space opposite to said commutator.

References Cited in the file of this patent

UNITED STATES PATENTS

| | | |
|---|---|---|
| 300,835 | Blair | June 24, 1884 |
| 1,135,327 | Savage | Apr. 13, 1915 |
| 1,632,357 | White | June 14, 1927 |
| 2,524,269 | Patterson | Oct. 3, 1950 |